(12) United States Patent
Wang et al.

(10) Patent No.: US 9,596,563 B2
(45) Date of Patent: *Mar. 14, 2017

(54) CLUSTERING GEOFENCE-BASED ALERTS FOR MOBILE DEVICES

(71) Applicant: GOOGLE INC., Mountain View, CA (US)

(72) Inventors: Xiaohang Wang, Jersey City, NJ (US); Farhan Shamsi, Rego Park, NY (US); Yakov Okshtein, Far Rockaway, NY (US); David Singleton, London (GB); Debra Lin Repenning, Riverside, CT (US); Lixin Zhang, Mountain View, CA (US); Marcus Alexander Foster, West Malling (GB)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/727,795

(22) Filed: Jun. 1, 2015

(65) Prior Publication Data

US 2015/0264527 A1    Sep. 17, 2015

Related U.S. Application Data

(63) Continuation of application No. 14/329,812, filed on Jul. 11, 2014, now Pat. No. 9,049,555, which is a
(Continued)

(51) Int. Cl.
*H04W 4/02* (2009.01)
*H04W 64/00* (2009.01)
(Continued)

(52) U.S. Cl.
CPC ............ *H04W 4/021* (2013.01); *H04W 4/12* (2013.01); *H04W 64/003* (2013.01); *G08B 1/08* (2013.01)

(58) Field of Classification Search
CPC .. H04W 4/021; G06Q 10/10; H04M 1/72544; H04M 3/5322; G06F 3/048; G08B 21/0227; B06R 25/04
See application file for complete search history.

(56) References Cited

U.S. PATENT DOCUMENTS 6,026,375 A    2/2000  Hall et al.
6,298,125 B1  10/2001  Goldberg et al.
(Continued)

FOREIGN PATENT DOCUMENTS

CN    101479757 A    7/2009
CN    102413425 A    4/2012
(Continued)

OTHER PUBLICATIONS

Time-Limited Coupons and Tickets for Wearable Display, with Peer-to-Peer Replication, IP.Com, pp. 1-5, Jun. 17, 2004.
(Continued)

*Primary Examiner* — Nizar Sivji
(74) *Attorney, Agent, or Firm* — Johnson, Marcou & Isaacs, LLC

(57) ABSTRACT

A geofence management system obtains location data for points of interest. The geofence management system determines, at the option of the user, the location of a user mobile computing device relative to specific points of interest and alerts the user when the user nears the points of interest. The geofence management system, however, determines relationships among the identified points of interest, and associates or "clusters" the points of interest together based on the determined relationships. Rather than establishing separate geofences for multiple points of interest, and then alerting the user each time the user's mobile device enters each geofence boundary, the geofence management system establishes a single geofence boundary for the associated points of interest. When the user's mobile device enters the
(Continued)

clustered geofence boundary, the geofence management system notifies the user device to alert the user of the entrance event. The user then receives the clustered, geofence-based alert.

20 Claims, 5 Drawing Sheets

Related U.S. Application Data continuation of application No. 13/950,511, filed on Jul. 25, 2013, now Pat. No. 8,798,646, which is a continuation of application No. 13/931,751, filed on Jun. 28, 2013, now Pat. No. 8,755,824.

(51) Int. Cl.
*H04W 4/12* (2009.01)
*G08B 1/08* (2006.01)

(56) References Cited

U.S. PATENT DOCUMENTS

| | | | |
|---|---|---|---|
| 6,414,635 B1 | 7/2002 | Stewart et al. | |
| 6,490,432 B1 | 12/2002 | Wegener et al. | |
| 6,587,835 B1 | 7/2003 | Treyz et al. | |
| 7,062,469 B2 | 6/2006 | Meyers et al. | |
| 7,519,470 B2 | 4/2009 | Brasche et al. | |
| 7,529,850 B2 * | 5/2009 | Verma | G06Q 10/10 455/404.1 |
| 7,676,369 B2 | 3/2010 | Fujimoto et al. | |
| 7,865,308 B2 | 1/2011 | Athsani et al. | |
| 8,019,532 B2 | 9/2011 | Sheha et al. | |
| 8,229,473 B1 * | 7/2012 | De La Rue | H04W 4/021 340/539.13 |
| 8,335,524 B2 | 12/2012 | Shutter | |
| 8,335,990 B2 | 12/2012 | Arrasvuori | |
| 8,427,308 B1 | 4/2013 | Baron, Sr. et al. | |
| 8,463,280 B1 | 6/2013 | Lim et al. | |
| 8,755,824 B1 | 6/2014 | Wang et al. | |
| 8,798,646 B1 | 8/2014 | Wang et al. | |
| 8,924,147 B2 | 12/2014 | Geller | |
| 8,930,162 B2 | 1/2015 | Wang et al. | |
| 9,049,555 B2 | 6/2015 | Wang et al. | |
| 9,144,008 B2 | 9/2015 | Attar et al. | |
| 9,341,479 B2 | 5/2016 | Repenning et al. | |
| 2001/0001145 A1 | 5/2001 | Barnett et al. | |
| 2001/0014868 A1 | 8/2001 | Herz et al. | |
| 2002/0095333 A1 | 7/2002 | Jokinen et al. | |
| 2002/0133424 A1 | 9/2002 | Joao | |
| 2003/0004802 A1 | 1/2003 | Callegari | |
| 2003/0004831 A1 | 1/2003 | Owens | |
| 2003/0005056 A1 | 1/2003 | Yamamoto et al. | |
| 2003/0050863 A1 | 3/2003 | Radwin | |
| 2003/0220835 A1 | 11/2003 | Barnes, Jr. | |
| 2004/0181461 A1 | 9/2004 | Raiyani et al. | |
| 2004/0203644 A1 | 10/2004 | Anders et al. | |
| 2004/0215517 A1 | 10/2004 | Chen et al. | |
| 2005/0029342 A1 | 2/2005 | Sugimoto et al. | |
| 2005/0144013 A1 | 6/2005 | Fujimoto et al. | |
| 2005/0209921 A1 | 9/2005 | Roberts et al. | |
| 2006/0011721 A1 | 1/2006 | Olsen et al. | |
| 2007/0167173 A1 | 7/2007 | Halcrow et al. | |
| 2007/0275736 A1 * | 11/2007 | Baek | H04M 1/72544 455/457 |
| 2007/0281690 A1 | 12/2007 | Altman et al. | |
| 2008/0076451 A1 | 3/2008 | Sheha et al. | |
| 2008/0176583 A1 | 7/2008 | Brachet et al. | |
| 2008/0248815 A1 | 10/2008 | Busch | |
| 2008/0258960 A1 | 10/2008 | Rosenberg et al. | |
| 2009/0012955 A1 | 1/2009 | Chu et al. | |
| 2009/0047972 A1 | 2/2009 | Neeraj | |
| 2009/0081994 A1 | 3/2009 | Drobot et al. | |
| 2009/0167553 A1 | 7/2009 | Hong et al. | |
| 2009/0181695 A1 | 7/2009 | Wirola et al. | |
| 2009/0307096 A1 | 12/2009 | Antonellis | |
| 2010/0017126 A1 * | 1/2010 | Holcman | G08B 21/0227 701/300 |
| 2010/0190513 A1 | 7/2010 | Andreasson | |
| 2010/0253508 A1 * | 10/2010 | Koen | B60R 25/102 340/539.13 |
| 2010/0322214 A1 | 12/2010 | Workman et al. | |
| 2011/0028160 A1 | 2/2011 | Roeding et al. | |
| 2011/0040626 A1 | 2/2011 | Lin | |
| 2011/0047509 A1 | 2/2011 | Arrasvuori | |
| 2011/0065423 A1 | 3/2011 | Karaoguz et al. | |
| 2011/0153143 A1 | 6/2011 | O'Neill et al. | |
| 2011/0209221 A1 | 8/2011 | Hanson et al. | |
| 2011/0238476 A1 | 9/2011 | Carr et al. | |
| 2011/0238514 A1 | 9/2011 | Ramalingam et al. | |
| 2012/0001928 A1 | 1/2012 | Sheha et al. | |
| 2012/0100872 A1 | 4/2012 | Alizadeh-Shabdiz et al. | |
| 2012/0108265 A1 | 5/2012 | Morin | |
| 2012/0130817 A1 | 5/2012 | Bousaleh et al. | |
| 2012/0140749 A1 | 6/2012 | Caldwell et al. | |
| 2012/0147862 A1 | 6/2012 | Poojary et al. | |
| 2012/0172019 A1 * | 7/2012 | Scott | H04M 3/5322 455/414.1 |
| 2012/0235812 A1 | 9/2012 | Maia et al. | |
| 2012/0242511 A1 * | 9/2012 | Morgan | B60R 25/04 340/989 |
| 2012/0270521 A1 | 10/2012 | Lopez Garcia et al. | |
| 2012/0295639 A1 | 11/2012 | Fitoussi et al. | |
| 2012/0310527 A1 | 12/2012 | Yariv et al. | |
| 2013/0005362 A1 | 1/2013 | Borghei | |
| 2013/0067044 A1 | 3/2013 | Levy-Yurista et al. | |
| 2013/0091452 A1 * | 4/2013 | Sorden | G06F 3/048 715/771 |
| 2013/0103697 A1 | 4/2013 | Hill et al. | |
| 2013/0155851 A1 | 6/2013 | Koodli et al. | |
| 2013/0155965 A1 | 6/2013 | Koodli et al. | |
| 2013/0178233 A1 * | 7/2013 | McCoy | H04W 4/021 455/456.3 |
| 2013/0179275 A1 | 7/2013 | Harb | |
| 2013/0267253 A1 | 10/2013 | Case et al. | |
| 2013/0290106 A1 | 10/2013 | Bradley et al. | |
| 2013/0303195 A1 | 11/2013 | Bahl et al. | |
| 2013/0345980 A1 | 12/2013 | van Os et al. | |
| 2014/0019255 A1 | 1/2014 | Wu et al. | |
| 2014/0143408 A1 | 5/2014 | Workman et al. | |
| 2015/0100271 A1 | 4/2015 | Wang et al. | |
| 2015/0230053 A1 | 8/2015 | Scellato et al. | |
| 2016/0249175 A1 | 8/2016 | Repenning et al. | |

FOREIGN PATENT DOCUMENTS

| | | |
|---|---|---|
| CN | 103188310 A | 7/2013 |
| EP | 2158784 A2 | 12/2008 |
| JP | 11-328222 | 11/1999 |
| JP | 2001-223712 | 8/2001 |
| JP | 2001-256398 | 9/2001 |
| JP | 2002-304562 | 10/2002 |
| JP | 2003-006543 | 1/2003 |
| JP | 2003-091678 | 3/2003 |
| JP | 2003-115001 | 4/2003 |
| JP | 2003-203084 | 7/2003 |
| JP | 2003-296625 A | 10/2003 |
| JP | 2004-078674 | 3/2004 |
| JP | 2004-157499 | 6/2004 |
| JP | 2004-272463 | 9/2004 |
| JP | 2010-020802 A | 1/2010 |
| JP | 2014-063309 A | 4/2014 |
| JP | 2014-519103 A | 8/2014 |
| KR | 10-2012-0071957 | 7/2012 |
| WO | 2008/134595 A1 | 11/2008 |
| WO | 2009/075043 A1 | 6/2009 |
| WO | 2013/106870 A1 | 7/2013 |
| WO | 2014/138250 A1 | 9/2014 |
| WO | 2014/210228 A1 | 12/2014 |
| WO | 2015/123363 A1 | 8/2015 |

(56) References Cited

OTHER PUBLICATIONS

Cho, J., Australian Patent Eamination Report No. 1 issued in Appl. No. 2013205204, pp. 1-4, Aug. 4, 2014.
Civan, E., Office Action issued in corresponding U.S. Appl. No. 13/594,771, filed Aug. 24, 2012, pp. 1-10 Jan. 7, 2013.
Hoon, H., International Search Report and Written Opinion issued in International Application No. PCT/US2014/020781, pp. 1-11, Jun. 27, 2014.
Khan, M., Office Action issued in copending U.S. Appl. No. 13/369,182, filed Feb. 8, 2012, pp. 1-11, Sep. 9, 2014.
Ko, Y., International Search Report and Written Opinion issued in International Application No. PCT/US2014/044202, pp. 1-9, Sep. 30, 2014.
Kolmel et al., Real Life Scenarios of Location Based Advertising, pp. 1-9, Jan. 1, 2003.
Lau, T., Office Action issued in copending U.S. Appl. No. 13/842,088, filed Mar. 15, 2013, pp. 1-11, Dec. 6, 2013.
Lau, T., Final Office Action issued in U.S. Appl. No. 13/842,088, filed Mar. 15, 2013, pp. 1-6, Mar. 19, 2014.
Lee, S., International Search Report and Written Opinion for International Patent Application No. PCT/US2013/021594, pp. 1-11, Apr. 1, 2013.
Maslin, E., International Search Report and Written Opinion issued in International Application No. PCT/US2015/015511, pp. 1-61, May 28, 2015.
Oz, E., Management Information Systems—Sixth Edition, pp. 1-36, Jan. 1, 2009.
Raymond, E., Office Action issued in copending U.S. Appl. No. 13/786,434, filed Mar. 5, 2013, pp. 1-8, Aug. 27, 2015.
Sivji, N., Office Action issued in copending U.S. Appl. No. 13/950,511, filed Jul. 25, 2013, pp. 1-18, Nov. 21, 2013.
Sivji, N., Office Action issued in copending U.S. Appl. No. 13/931,751, filed Jun. 28, 2013, pp. 1-22, Sep. 16, 2013.
Sivji, N., Office Action issued in copending U.S. Appl. No. 14/329,812, filed Jul. 11, 2014, pp. 1-17, Sep. 15, 2014.
Spilling et al., Performance Enhancement in Cellular Networks with Dynamic Cell Sizing, *IEEE*, pp. 1589-1593, Jan. 1, 2000.
Stikeman, A., Biometrics, *Technology Review*,vol. 104 (1), pp. 106-107, Jan. 1, 2001.
Cosme, N., Office Action issued in copending U.S. Appl. No. 14/179,209, filed Feb. 12, 2014, pp. 1-28, Nov. 24, 2015.
Bai, "International Preliminary Report on Patentability issued in International Application No. PCT/US2014/044202", mailed on Jan. 7, 2016, 6 pages.
Becamel, "International Preliminary Report on Patentability issued in International Application No. PCT/US2014/020781", mailed on Sep. 17, 2015, 8 pages.
Cosme, "U.S. Office Action issued in copending U.S. Appl. No. 14/179,209, filed Feb. 12, 2014", mailed on May 11, 2016, 31 pages.
Jeong, "Office Action issued in Korean Application No. 10-2014-7023023", mailed on Jun. 22, 2015, 6 pages of English Translation and 6 pages of Korean Office Action.
Lau, "U.S. Office Action issued in copending U.S. Appl. No. 14/572,755, filed Dec. 16, 2014", mailed on Apr. 12, 2016, 8 pages.
Moon, "International Preliminary Report on Patentability issued in International Application No. PCT/US2013/021594", mailed on Jul. 24, 2014, 8 pages.
Nyugen, "U.S. Office Action issued in copending U.S. Appl. No. 13/786,416, filed Mar. 5, 2013", mailed on Jun. 18, 2013, 15 pages.
Seong, "Office Action issued in Korean Application No. 10-2016-7002538", mailed on Mar. 2, 2016, 4 pages of English Translation and 3 pages of Korean Office Action.
Bai, "International Preliminary Report on Patentability issued in International Application No. PCT/US2015/015511", mailed on Aug. 25, 2016, 10 pages.
Cosme, "U.S. Office Action issued in copending U.S. Appl. No. 14/179,209, filed on Feb. 12, 2014", mailed on Sep. 6, 2016, 33 pages.
Lau, "U.S. Office Action issued in copending U.S. Appl. No. 14/572,755, filed on Dec. 16, 2014", mailed on Sep. 13, 2016, 15 pages.
Kihou, "Japanese Office Action issued in Japanese Application No. 2015-563130", mailed on Aug. 29, 2016, 3 pages of English Translation and 2 pages of Japanese Office Action.
Zhou, "Chinese Office Action issued in Chinese Application No. 201480046073.2", mailed on Aug. 25, 2016, 8 pages of English Translation and 6 pages of Chinese Office Action.
Wuilleme, "Supplementary European Search Report issued in European Application No. 14760121.5", mailed on Nov. 11, 2016, 6 pages.
U.S. Appl. No. 13/786,434 to Repenning et al. filed Mar. 5, 2013.
U.S. Application No. 14/179,209 to Scellato et al. filed Feb. 12, 2014.
U.S. Application No. 14/572,755 to Wang et al. filed Dec. 16, 2014.
Cranley, "Extended European Search Report issued in European Application No. 14817048.3", mailed on Dec. 19, 2016, 11 pages.

\* cited by examiner

CLUSTERING GEOFENCE-BASED ALERTS FOR MOBILE DEVICES

CROSS-REFERENCE TO RELATED APPLICATIONS

This application is a continuation of and claims priority to U.S. patent application Ser. No. 14/329,812, filed Jul. 11, 2014 and entitled "Clustering Geofence-Based Alerts For Mobile Devices," which is a continuation of U.S. patent application Ser. No. 13/950,511, filed Jul. 25, 2013 and entitled "Clustering Geofence-Based Alerts For Mobile Devices," which is a continuation of U.S. patent application Ser. No. 13/931,751, filed Jun. 28, 2013 and entitled "Clustering Geofence-Based Alerts For Mobile Devices." The entire disclosures of the above-identified priority applications are hereby fully incorporated herein by reference.

TECHNICAL FIELD

The present disclosure relates generally to geofence-based alerts, and more particularly to clustering of related points of interest into consolidated geofences.

BACKGROUND

Location data from a mobile device can be used for numerous applications. Many applications use location data for locating friends, playing games, and assisting a user with directions, for example. The location data can also be used to provide an alert on a user's mobile device when the user is the vicinity of a point of interest, such as a business, an institution, landmark, park, or other location that would be of interest to a user. For example, a user may choose to be alerted every time the user is near a particular store or restaurant, especially if the alert includes a promotional offer for the store or restaurant of interest.

In conventional geofence-based alert systems, geofence boundaries are established for each point-of-interest location. To mark a point of interest, the latitude and longitude coordinates for the point of interest are determined. A radius marking the bounds of the geofence is then applied around the point of interest. The data for each geofence boundary is then stored in the user's mobile computing device, such is in the cache of a user's mobile phone. When the user device enters the geofence boundary, the user device provides an alert to the user regarding the entrance event. For example, the user device may inform the user that "you have a coffee shop nearby providing a discount offer."

Although conventional geofence-based alert systems work well in sparsely populated areas, a user device traveling thorough a densely populated area is oftentimes inundated with geofences for numerous points of interest. Storing the geofence data can consume the cache memory of the user device, and processing and providing numerous alerts for the numerous geofences can drain battery power. The numerous alerts can also annoy the user. For example, if a coffee chain has five storefronts within a kilometer of each other, a user traveling though the area may receive five separate geofence-based alerts (one for each coffee shop). Similarly, a user driving down a road may receive a geofence-based alert every time the user device nears a fuel station included among the points of interest.

SUMMARY

In certain example aspects described herein, a computer-implemented method for alert notification, and more particularly clustered alert notification, is provided. A geofence management system determines a plurality of points of interest relative to a location of a user computing device, such as a mobile telephone. The geofence management system then determines a relationship among two or more of the points of interest. In response to determining the relationship among the two or more of the points of interest, the geofence management system associates two or more of the points of interest together and then determines a geofence boundary encompassing the associated points of interest. The geofence management system communicates the geofence boundary data for the geofence boundary to the user computing device. When the geofence management system determines that the user device has entered the geofence boundary, the geofence management system instructs the user device to provide an alert on the user computing device regarding one or more of the associated points of interest. The user then receives the alert for the one or more associated points of interest.

In certain other example aspects, a system for providing an alert notification, and more particularly a clustered alert notification, is provided herein. Also provided in certain aspects is a computer program product for providing an alert notification.

These and other aspects, objects, features and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
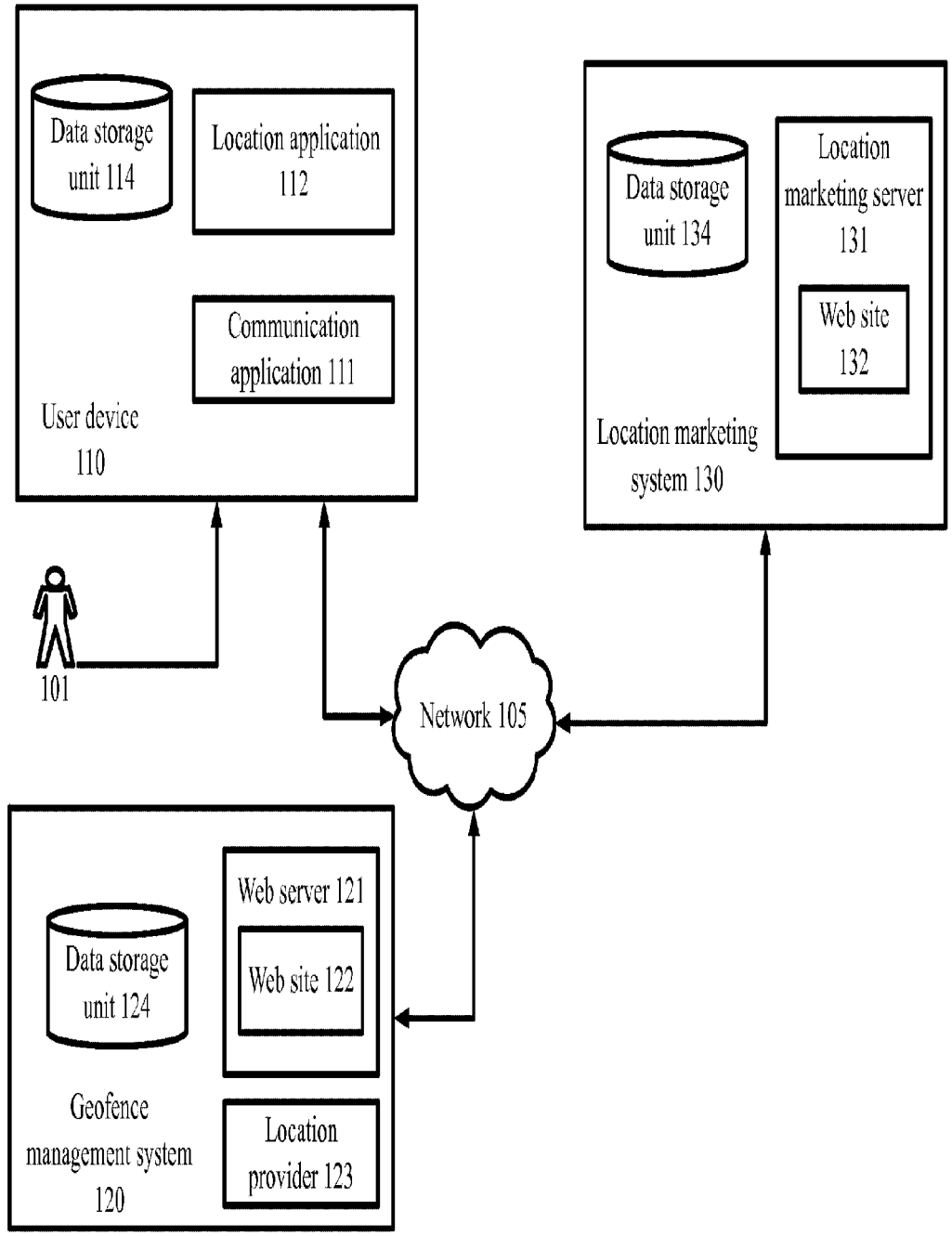
FIG. 1 is a block diagram depicting a system for clustering geofence-based alert notification, in accordance with certain example embodiments.

As disclosed herein, a geofence management system obtains location data for points of interest, such as latitude and longitude coordinates for merchant storefronts. The geofence management system then determines, at the option of the user, the location of a user mobile computing device relative to specific points of interest and alerts the user when the user nears the points of interest. However, the geofence management system determines relationships among the specific points of interest, and associates or "clusters" the points of interest together based on the determined relationships. For example, the geofence management system determines that three merchant storefronts providing discount offers are within a kilometer of each other. Rather than establishing separate geofence boundaries for each storefront—and then alerting the user of an offer each time the user's mobile device enters the separate geofence boundary—the geofence management system establishes a single geofence boundary around the three storefronts. When the user's mobile device enters the single geofence boundary, the geofence management system notifies the user device to alert the user of the entrance event. For example, the user device provides a single alert to the user that "you have three nearby offers." In order to use the geofence management system as described herein, the user in certain examples may have to install a geofence management system application on the user device and/or specify settings on the user device.

More particularly, the geofence management system obtains location data for multiple points of interest. For example, one or more location marketing systems provide the geofence management system with location information for various merchants associated with the location marketing system. Additionally or alternatively, merchants can provide the geofence management system with location information for merchant storefronts of the merchant. Additionally or alternatively, the geofence management system determines location information for multiple locations that may be of interest to one or more users. The location information can be any information that establishes the location of a point of interest, such as a street address, Ordnance Survey Grid Reference information, and/or latitude and longitude coordinates for points of interest. The geofence management system stores the information in an accessible point-of-interest database.

To manage geofences for a particular user, the geofence management system obtains, at the option of the user, the location information for a user computing device, such as a mobile phone. The user may have to activate or otherwise authorize an application executing on the user device to monitor the location of the user device for use in identifying points of interest to the user. That is, at the option of the user, the location of the user device is determined, such as through a location application on the user device that is associated with a location-service. The location of the user device may also be determined through a global positioning service (GPS). In certain example embodiments, the geofence management system operates as a location-based service that monitors the location of the user device. For example, a location application on the user device determines the location of the user device and communicates the user device location to the geofence management system. The geofence management system receives the user device location information, such as latitude and longitude coordinates for the user device, and monitors the location of the user device. In alternative example embodiments, the geofence management system may operate or otherwise execute partially or entirely on the user device.

In certain example embodiments, the geofence management system additionally receives planned route information for the user device. For example, a user can enter destination information into a mapping application on the user device. After a route is determined based on the current location of the user device and the entered destination, the mapping application communicates the route information, including the intended destination, to the geofence management system. The geofence management system then receives the planned route and intended destination information for the user device.

Based on the location information received from the user device, the geofence management system identifies specific points of interest relative to the location of the user device. That is, the geofence management system dynamically determines points of interest as a particular user device nears the specific points of interest (or the geofence management systems determines that the user device is expected to be near the points of interest). For example, the geofence management system accesses the point-of-interest location database to determine all of the points of interest within a configurable radius (or other shaped area, such as a square, a city or county boundary, etc.) around the user device. The geofence management system can determine, for example, all points of interest within 10-kilometer radius of the user device. Additionally or alternatively, in certain example embodiments the geofence management system may identify points of interest along a received route of the user device or at an intended destination of the user.

After identifying specific points of interest, the geofence management system associates related points of interest together into a cluster. That is, the geofence management system determines relationships among two or more points of interest, and then groups the points of interest according to the determined relationships. Numerous relationships among points of interest can exist. For example, points of interest can relate to each other based on proximity. Three merchant storefronts providing offers to a user, for example, may be within a kilometer of each other. The geofence management system thus clusters the three stores together based on their proximity to each other. The points of interest can additionally or alternatively relate to each other based on affiliation. For example, multiple merchant storefronts in a town may be affiliated with the same merchant chain, such as a chain of coffee shops having multiple coffee shops in the town. The geofence management system thus clusters the three stores together based on their affiliation to the chain and to their proximity within the town. In another example embodiment, separate merchant storefronts within a central location are affiliated with the central location, such as three storefronts in a mall. The geofence management system thus clusters the three storefronts together based on their central location affiliation with the mall. In certain example embodiments, points of interest may relate to the planned route and/or destination of the user. For example, three fuel stations along a planned route or at an intended destination may provide discount offers.

Once the geofence management system associates related points of interest into a cluster, the geofence management system defines a single geofence boundary around the clustered points of interest. That is, the geofence management system determines a geofence boundary encompassing two or more of the identified points of interest sharing a relationship, thereby forming a clustered geofence boundary. For example, if three merchant storefronts are clustered based on proximity, such as three merchant storefronts that are within a kilometer of each other, the geofence management system defines a clustered geofence boundary encompassing the three merchant storefronts. Likewise, if multiple merchant storefronts in a town belong to a chain, such as a coffee shop chain, the geofence management system defines a clustered geofence boundary encompassing all of the storefronts of the chain. Similarly, the geofence management system can define a clustered geofence boundary around a mall, for example, that has three points of interest therein. And, if the geofence management system receives route data from a user device, the geofence management system can define a single geofence boundary around a cluster of fuel stations along the route or at the final destination. The clustered geofence boundaries are also dynamic, in that the geofence management system defines the clustered geofence boundary based on the location of points of interest near the user device.

After defining one or more clustered geofence boundaries, the geofence management system communicates the clustered geofence boundary data to the user device. That is, the geofence management system communicates geofence boundary information, such as the clustered geofence boundary coordinates, to the user device. The clustered geofence boundary coordinates may comprise, for example, the latitude and longitude points encompassing the clustered points of interest. The user device then stores the coordinates, for example, in the cache of the user device. In certain example embodiments, the geofence management system communicates multiple clustered geofence boundaries to the user device. For example, the geofence management system can communicate geofence boundary data for clusters that are determined based on point-of-interest proximity, affiliation, route, destination, or any other relationship as described herein. In an example, the clustered geofence boundary data can comprise a location point and a defined radius around the location point. In this example, the location point can be a central location of all points of interest in the cluster, a location of one of the points in the cluster, a relational location for all points of interest in the cluster (for example, a mall location in which the points of interest are located), or other suitable location point.

Once the clustered geofence boundary is defined and communicated to the user device, the geofence management system determines that the user device enters the clustered geofence boundary. For example, following receipt of a clustered geofence boundary data, an application on the user device, such as the location application, monitors the user device for an entry event into the clustered geofence boundary. When the user device enters a clustered geofence boundary, the user device notifies the geofence management system of the entrance event. For example, the location application on the mobile device communicates an entrance notification to the geofence management system, thereby alerting the geofence management system of the entrance event. The geofence management system then receives the notification that the user device has entered the clustered geofence boundary.

After receiving the entrance notification, the geofence management system notifies the user device to provide a clustered geofence alert to the user. That is, the geofence management system instructs the user device to provide an alert on the user device regarding the associated points of interest within the clustered geofence boundary. The geofence management system also provides content information for the alert to the user device. For example, the geofence management system invokes the location application on the user device. The location application then provides an alarm, vibration, or other alert signal on the user device, which the user then receives, along with the content information for the clustered points of interest. That is, the geofence management system provides a content-based alert notification to the user for the clustered points of interest.

In alternative example embodiments, the geofence management system functionality may operate or otherwise execute partially or entirely on the user device. For example, the user device stores location data for points of interest, along with content for the points of interest. When an application on the user device, such as a geofence management system application, determines that points of interest are nearby, the application clusters related points of interest together. The application then defines a single geofence boundary around the clustered points of interest to form a clustered geofence boundary. When the user device enters the clustered geofence boundary, the application retrieves stored content for the points of interest and provides a content-based alert for the clustered points of interest.

The content information comprises any information about one or more of the clustered points of interest. For example, if the clustered geofence boundary encompasses three coffee shops of interest to the user, the content information may inform a user entering the clustered geofence boundary that "three coffee shops are nearby." If the clustered geofence encompasses a mall having three stores providing discount offers, for example, the content may inform a user entering the clustered geofence boundary that "three offers are available within the mall." If the geofence cluster encompasses fuel stations along a planned user route or at a user's planned destination, the content information can inform the user that "three fuel stations are upcoming along your route" or that "three fuel stations are available at your destination." In each case, the content information can include details regarding each merchant location, such as merchant name, location, type of merchant, products offered at the merchant, offers available to the user for the merchant, or other suitable information.

By clustering points of interest together into a single geofence boundary, the methods and systems taught herein reduce the number of alerts a user receives while in a given location. That is, rather than receiving a single geofence-based alert for each individual point of interest that the user might encounter—such as while traveling through a densely populated area—the methods and systems taught herein allow the user to receive individual alerts comprising multiple points of interest. In other words, multiple points of interest that would otherwise each trigger an alert are consolidated into a single, clustered alert. Further, because a user device employing the methods and systems taught herein does not have to receive, store, and process as many geofence-based alerts, the methods and systems taught herein both reduce battery consumption of the user device and conserve storage space. For example, the user device does not have to store as many geofence coordinates in its cache, and the user device does not have to expend battery power alerting the user of every point of interest that user might encounter.

Example System Architectures

Turning now to the drawings, in which like numerals indicate like (but not necessarily identical) elements throughout the figures, example embodiments are described in detail.

FIG. 1 is a block diagram depicting a system for clustering geofence-based alert notifications, in accordance with certain example embodiments. As depicted in FIG. 1, the exemplary operating environment 100 includes a user network computing device 110, a geofence management computing system 120, and a location marketing computing system 130.

Each network 105 includes a wired or wireless telecommunication means by which network devices (including devices 110, 120, and 130) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment. In some embodiments, a user 101 associated with a device must install an application and/or make a feature selection to obtain the benefits of the techniques described herein.

Each network device 110, 120, and 130 includes a device having a communication module capable of transmitting and receiving data over the network 105. For example, each network device 110, 120, and 130 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 120, and 130 are operated by end-users or consumers, merchant system operators, geofence management system operators, offer provider system operators, and financial account issuer system operators, respectively.

The user 101 can use the communication application 111, such as a web browser application or a stand-alone application, to view, download, upload, or otherwise access documents or web pages via a distributed network 105. The network 105 includes a wired or wireless telecommunication system or device by which network devices (including devices 110, 120, and 130) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, near field communication (NFC), or any combination thereof or any other appropriate architecture or system that facilitates the communication of signals, data, and/or messages.

The communication application 111 can interact with web servers or other computing devices connected to the network 105, including the location marketing web server 131 of the location marketing system 130 and the web server 121 of the geofence management system 120.

The user device 110 includes, for example, a location application 112 that is configured to interact and communicate with the geofence management system 120 and the location marketing system 130 via the communication application 111 and the network 105. For example, the location application 112 can be used and configured to receive and send device location data to the geofence management system 120 and the location marketing system 130. As used herein, "location data" can include any data processed in an electronic communications network or by an electronic communications service that indicates the geographical position of the user device 110. For example, the location data may include latitude and longitude for the user device 110 or a location of a point of interest.

The location application 112 may also be configured to communicate and interact with a location-based service provider that, in conjunction with the user device 110, facilitates determination of the location of the user device 110. For example, the location application 112 may, along with a location-based service, rely on WiFi signals and cellular communication towers to determine the location of the user device 110. Additionally or alternatively, the location application 112 may rely on satellites, Global Positioning System ("GPS") location technology, a Network Location Provider ("NLP"), a map application, or other location identifying technology of the user device 110 to determine location data for the user device 110. For example, in certain embodiments the location application 112 may communicate and interact with the location provider 123 of the geofence management system 120. The location application 112 is also configured to send and receive alert content from the geofence management system 120 or the location marketing system 130. For example, location application 112 is configured to receive content regarding coupons, specials offers, or other items related to the marketing efforts of the location marketing system 130. The location application 112 is also configured to receive content unrelated to marketing efforts, such as names of parks or other landmarks that may be of interest to a user 101.

The user device 110 includes a data storage unit 114 that is accessible by the communication application 111 and the location application 112. In certain embodiments, for example, the data storage unit 114 stores, at the option of the user, data regarding the location of the device, such as Wi-Fi hotspots or cellular communication towers that are or have been available to the user device 110. The data storage unit 114 of the user device 110 can also store content related to the location data. The exemplary data storage unit 114 can include one or more tangible computer-readable media. The data storage unit 114 can be stored on the user device 110 or can be logically coupled to the user device 110. For example, the data storage unit 114 can include on-board flash memory and/or one or more removable memory cards or removable flash memory.

The geofence management computing system 120 comprises a web sever 121 and associated web site 122. The web server 121, for example, may represent the computer-implemented system that the geofence management computing system 120 employs to manage geofences on behalf of a user 101. In certain example embodiments, a user 101, accesses the website 122 of the web server 121 to associate points of interest with the geofence management system 120. The geofence management system 120, such as through the web server 121, can also be used and configured to receive point-of-interest location data from the location marketing system 130 via the network 105, a merchant system (not shown), or any other system that provides location data for points of interest. The geofence management system 120 can likewise be used and configured to receive and store content information regarding the points of interest. In certain embodiments, the geofence management system 120 comprises a web-crawler, for example, that obtains and indexes location data for points of interest that may be of interest to users generally or to a particular user 101.

The geofence management system 120 includes an accessible data storage unit 124. In certain embodiments, for example, the data storage unit 124 stores location data for the user device, such as cellular communication towers and Wi-Fi signals that are or have been available to the user device 110. The data storage unit 124 may also store point-of-interest content information received from the location marketing system 130, for example. The exemplary data storage unit 124 can include one or more tangible computer-readable media. The data storage unit 124 can be stored on the user device 110 or can be logically coupled to the user device 110. For example, the data storage unit 124 can include on-board flash memory and/or one or more removable memory cards or removable flash memory.

The geofence management system 120 may execute and operate independently of the location application 112 as shown. Additionally or alternatively, the geofence management system 120 may execute completely or partially within the location application 112, or it may execute and operate as a companion application to the location application 112 on the user device 110. The geofence management system 20 can use a location provider 123 that determines the location of the user device 110 based on, for example, location data received from the location application 112. The location provider may rely on WiFi signals, cellular communication data, satellites, a Global Positioning System ("GPS") location technology, a Network Location Provider ("NLP"), a map application, or other location identifying technology of the user device 110 to determine the user device location.

The location marketing system 130 comprises a location-marketing server 131 and associated web site 132. The location marketing system server 131 may represent the computer-implemented system that the location marketing system 130 employs to provide point-of-interest location data to the geofence management system 120. The location marketing system server 131 may also represent the computer-implemented system that generates alert content associated with the points of interest. In certain example embodiments, the location marketing system 130 may represent any number of systems that geofence management system 120 may used gather point-of-interest location data and content information. For example, the location marketing system 130 may be the marketing system of a product manufacturer or a service provider. The location marketing system 130 may be a social network system of a user that can provide preferences and historical data of a user's activities. The location marketing system 130 may be a coupon aggregator or provider. The location marketing system 130 may also be a mapping program. The location marketing system 130 may be any other service or system that may provide location data and content information that the geofence management system 120 can use to define the location of a point of interest and to obtain content information for the point of interest.

The location marketing system 130 can communicate with the geofence management system 120 or the user device 110 via any available technologies. These technologies may include, but would not be limited to, an Internet connection via the network 105, email, text, instant messaging, or other suitable communication technologies. The location marketing system 130 may include a data storage unit 134 accessible by the server 131 of the location marketing system 130. The data storage unit 133 can include one or more tangible computer-readable storage devices. The data storage unit 134 can be stored on the location marketing system 130 or can be logically coupled to location marketing system 130. For example, the data storage unit 134 can include on-board flash memory and/or one or more removable memory cards or removable flash memory.

It will be appreciated that the network connections shown in FIG. 1 are exemplary and that other means of establishing a communications link between the computers and devices can be used. Moreover, those having ordinary skill in the art having the benefit of the present disclosure will appreciate that the user device 110, the geofence management system 120, and the location marketing system illustrated in FIG. 1 can have any of several other suitable computer system configurations. For example, a user device 110 embodied as a mobile phone or handheld computer may or may not include all the components described herein.

Example Processes

The components of the example operating environment 100 are described hereinafter with reference to the example methods illustrated in FIGS. 2-4.

Figure 2:
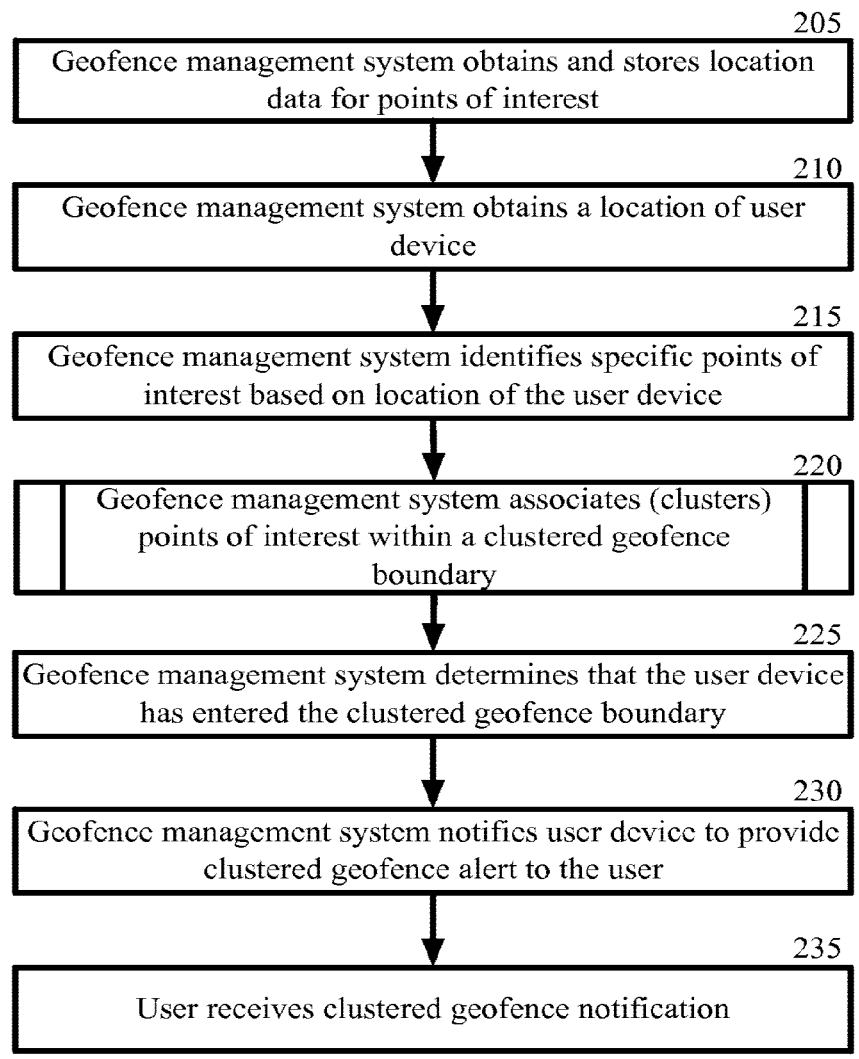
FIG. 2 is a block flow diagram depicting a method for clustering geofence-based alerts, in accordance with certain example embodiments.

FIG. 2 is a block flow diagram depicting a method for redeeming offers while conducting transactions with an geofence management system, in accordance with certain example embodiments.

With reference to FIGS. 1 and 2, in block 205, the geofence management system 120 obtains and stores location data for points of interest. That is, a geofence management system 120 obtains and stores location information for geographical locations that might be of interest to a broad range of different users 101. For example, the locations can comprise specific merchant storefronts, retailers, restaurants, landmarks, buildings, parks, rail stations, airports, ports, sports arenas, or any other location that might be of interest to one or more users 101. Typically, the location data comprises the latitude and longitude coordinates of each point of interest. Additionally or alternatively, the location data may comprise any other suitable location data for points of interest, such as the street address for each point of interest or the Ordnance Survey Grid Reference information. In certain example embodiments, the geofence management system 120 converts such location data to latitude and longitude coordinates for the points of interest. The location data can also include information regarding specific points of interest, such as the name of the point of interest.

The geofence management system 120 obtains location data from any source. For example, a location marketing system 130 provides the geofence management system 120 with location data for points of interest related to the marketing efforts of the location marketing system 130. Additionally or alternatively, merchants can provide the geofence management system 120 with location information for merchant storefronts of the merchant. For example, merchants may provide the geofence management system 120 with location data for point-of-sale terminals associated with the merchant.

In addition to location data, the geofence management system obtains content information related to points of interest. For example, a location marketing system 130 may provide location data for all merchant storefronts of a coffee shop chain, along with content for coupons or other special offers that the chain is providing. The content of an offer can include details about the offer, such as conditions and limitations of the offer. The content may also describe the offer, such as "20% off coffee" at all the merchant's storefronts. The offer can be any type of offer, such as a ticket, coupon, discount, rebate, voucher, special offer, prepaid offer, or any other type of promotion that can be exchanged for a financial discount or rebate when purchasing a product or service, for example. For online retailers or merchants, for example, the offer may be any type of coupon code, promotional or promo code, discount code, key code, reward code, or any other type code of exchanged for a financial discount.

Additionally or alternatively, in certain example embodiments the geofence management system 120 gathers point-of-interest location data and associated content. For example, the geofence management system 120 collects point-of-interest location data that might be of interest to users 101. In certain example embodiments, a user 101 may, such as through a web site 122 of the geofence management system 120, provide names of points of interest to the geofence management system 120. The geofence management system 120 then determines the location data for the points of interest, along with any content pertinent to the points of interest. In certain example embodiments, the geofence management system 120 may, at the option of the user 101, rely on the user history of the user 101 to identify points of interest for a particular a user 101. The user history can include, for example, the user's social network content, user content, purchase history, search history, or any other items related to the user's online activities. For example, if a user 101 frequently purchases electronics, the geofence management system 120 may, at the option of the user 101, obtain location data for electronics stores on behalf of the user 101. In certain example embodiments, the geofence management system 120 may rely on a web crawler to obtain location data (and content information) for points of interest.

Once the geofence management system 120 obtains location data for points of interest, the geofence management system 120 stores the location data in an accessible database. The geofence management system 120 also stores content information for the points of interest, along with any other information regarding the points of interest. That is, the geofence management system 120 stores the location data and content so that the data and content can be retrieved and used when the user device 110 is near one or more of the points of interest. For example, the geofence management system 120 stores the location data and content information in the data storage unit 124 of the geofence management system 120.

In block 210, the geofence management system 120 obtains, at the option of the user, a location of a user device 110. That is, to manage geofence-based alerts for a particular user, the geofence management system 120, at the option of the user, receives and monitors the location of the user device 110, such as a mobile phone of the user 101. A location application 112 on the user device 110, for example, determines the location of the user device 110, such as the latitude and longitude coordinates of the user device 110. For example, the location application 112 coordinates with a location-based service to determine the location of the user device 110. Additionally or alternatively, the location application 112 can rely on a global positioning system to determine the location of the user device 110. Additionally or alternatively, the location for the user device 110 may comprise any other suitable location data, such as the street address for the user device 110 or Ordnance Survey Grid Reference information for the user device 110. The location application 112, for example, communicates the location data to the geofence management system 120, and the geofence management system receives the location data. In certain embodiments, the user 101 may have to provide or adjust a setting on the user device 110 in order for the geofence management system 120 to obtain the location of the user device 110. For example, the user 101 may have to provide or adjust a setting of the location application 112 so that the location application 112 can determine location information of the user device 110.

In certain example embodiments, the geofence management system 120 converts location data to latitude and longitude coordinates for the user device 110. In certain example embodiments, the geofence management system 120 and associated location provider 123 operate as a location-based service that, in conjunction with the location application 112 of the user device 110, determine and monitor the location of the user device 110 at the option of the user. For example, the geofence management system 120 uses the location provider 123 to determine and monitor the location of the user device 110 based on location data received from the location application 112 of the user device 110.

In certain example embodiments, an application on the user device 110, such as the location application 112, may periodically refresh the location data for the user device 110. That is, an application on the user device 110 may, in association with a location-based service or global positioning system, determine the location of the user device 110 at configurable intervals. By refreshing the location data, the application on the user device 110 obtains new location data when the device moves to a different location. In certain example embodiments, the location application 112 communicates the location data of the user device 110 to the geofence management system 120 when new location data is obtained. Additionally or alternatively, the location application 112 on the user device 110 may periodically communicates the location data to the geofence management system 120 at configurable intervals, regardless of whether new location data was obtained during the refresh. The geofence management system 120 then receives the location information for the user device 110.

In block 215, the geofence management system 120 identifies specific points of interest based on the location of the user device 110. That is, after determining the location of the user device 110, the geofence management system 120 relies on the location data for points of interest to identify points of interest that are near or nearby the determined location of the user device 110. For example, the geofence management system 120 accesses point-of-interest location data in a database on the data storage unit 124 to identify points of interest near the user device 110. Nearby points of interest, for example, can comprise any or all points of interest that are within a configurable radius around the user device 110. For example, the geofence management system 120 may determine that the near or nearby points of interest are those that are within a 10 kilometer radius of the user device 110.

To determine whether a particular point of interest falls within a configurable radius around the user device 110, the geofence management system 120 can compare the received location data for the user device 110 with the location data for points of interest that geofence management system 120 has obtained. For example, the geofence management system 120 can compare the latitude and longitude coordinates of the user device 110 with the latitude and longitude coordinates for points of interest that geofence management system 120 maintains on data storage unit 124 of the geofence management system 120. If the location data for a point of interest places the point of interest within the configurable radius around the user device, for example, the geofence management system 120 determines that the point of interest is near the user device 110 (and hence presumably the user).

In certain example embodiments, the geofence management system 120 may identify specific points of interests that the geofence management system 120 anticipates will be near the user device 110. That is, the geofence management system 120 may, at the option of the user, receive or obtain information indicating that the user device 110 will be near specific points of interest. For example, a user 101 may enter destination information into a mapping application (not shown) on the user device. Based on the current location of the user device and the location of the destination, the mapping application determines a route for the user device 110. The location application 112, for example, may be configured to receive the planned route and destination information from the mapping application and then communicate the planned route and destination information to the geofence management system 120. The geofence management system 120 receives the planned route and intended destination information for the user device 110. The geofence management system 120 can then identify specific points of interest along the planned route and at the expected destination. For example, the geofence management system 120 can use the location provider 123 to identify specific points of interest along the planned route and at the expected destination. In certain example embodiments, the location application 112 may operate as the mapping application for the user device 110.

In block 220, the geofence management system 120 associates (clusters) points of interest within a clustered geofence boundary. That is, the geofence management system 120 determines relationships among the identified points of interest that are near (or expected to be near) the user device. For example, two or more points of interest may be grouped together based on their proximity to each other, their affiliation with each other, their affiliation with a planned route or destination of the user device 110, or any other determined relationship. The geofence management system 120 then defines a single geofence boundary around related points of interest to form a clustered geofence boundary. The geofence management system 120 also communicates the clustered geofence boundary data to the user device 110. In certain example embodiments, because the geofence management system 120 defines clustered geofences based on points of interest near the user device of a particular user, for example, the geofence management system 120 dynamically creates clustered geofences for particular users. The details of block 220 are described in further detail below with reference to FIG. 3.

In block 225, the geofence management system 120 determines that the user device 110 has entered the clustered geofence boundary. That is, the geofence management system 120 determines, based on a second location of the user device 110, that the user device 110 is at or within the geofence boundary. For example, an application on the user device 110, such as the location application 112, monitors the location of the user device 110 as described herein a location of the user device 110. In certain example embodiments, the location application 112 may periodically refresh the device location data at configurable intervals. The location application 112 compares the location data of the user device 110 with the clustered geofence boundary data and determines that the user device 110 is at or within the clustered geofence boundary. The location application 112 then communicates a notice of the entrance event to the geofence management system 120. That is, the location application 112 informs the geofence management system 120 that the user device is at or within the clustered geofence boundary.

Additionally or alternatively, the location application 112 on the user device 110, such as the location application 112, communicates location data for the user device 110 to the geofence management system 120, and the geofence management system 120 determines that the user device is at or within the geofence boundary. For example, the location application 112 periodically communicates location data for the user device 110 to the geofence management system 120 at configurable intervals, such as at configurable location data refresh times, as described herein. Based on the location data received from the user device 110, the geofence management system 120 compares the location data of the user device 110 with the clustered geofence boundary data. The geofence management system 120 then determines that the user device 110 is at or within the clustered geofence boundary.

In block 230, the geofence management system 120 notifies the user device 110 to provide a clustered geofence alert to the user 101. That is, based on the determination that the user device 110 is at or within the clustered geofence boundary, the geofence management system 120 informs the user device 110 to provide an alert notification to the user 101 regarding one or more of the associated points of interest encompassed within the clustered geofence boundary. For example, the geofence management system 120 communicates a notification to the location application 112 of the user device 110, thereby invoking the location application 112. The location application 112 then provides an alert on the user device 110 to the user 101.

The alert can be any type of configurable alert. For example, the location application 112 can provide an audible alert, a vibration, a visible alert (such as a text message), or any combination thereof. In certain example embodiments, the location application 112 may present point-of-interest details on the display of the user device 110, such as on a map or in e-mail. The location application 112 may also rely on any other configurable alerting procedure, such as sending an email, a push notification, a text message, or another communication to the user 101. The location application 112 may also store the alert for later user. In certain example embodiments, the user 101 can configure the alert as desired by setting or modifying user preferences on the user device 110.

The geofence management system 120 also provides content information associated with the alert so that the alert is a content-based alert. For example, when notifying the user device 110 to provide a clustered geofence alert to the user 101, the geofence management system 120 communicates content to the user device 110 accompany the alert. The location application 112, for example, receives the content information along with the alert and provides the content to the user 101 as part of the alert. Additionally or alternatively, the geofence management system 120 informs the location application 112 of the entrance event at or within the clustered geofence boundary, and the location application 112 determines content to associate with the alert. For example, the location application 112 receives alert content along the clustered geofence boundary data as described in block 220 (and in block 320 of FIG. 3). The location application 112 then stores the content in the data storage unit 114 of the user device 110. When the geofence management system 120 informs the location application 112 of the entrance event, the location application 112, for example, identifies stored content information to accompany the alert.

The content information comprises any configurable information about one or more of the clustered points of interest. For example, if the clustered geofence boundary encompasses three coffee shops of interest to the user, the content information may inform a user entering the clustered geofence boundary that "three coffee shops are nearby." If the clustered geofence encompasses a mall having three stores providing discount offers, for example, the content may inform a user entering the clustered geofence boundary that "three offers are available within the mall." If the geofence cluster encompasses fuel stations along a planned user route or at a user's planned destination, the content information can inform the user that "three fuel stations are upcoming along your route" or that "three fuel stations are available at your destination." In each case, the content information can include details regarding each merchant location, such as merchant name, location, type of merchant, products offered at the merchant, offers available to the user for the merchant, or other suitable information.

In block 235, the user 101 receives the clustered geofence notification. That is, the user 101 receives the audible alert, vibration, visible alert, push notification, text message, or another communication or signal from the user device 110 associated with the clustered geofence alert. The user 101 also receives the content associated with the alert. For example, depending on how the geofence management system 120 clustered the points of interest, the location application 112 informs the user 101, as part of the alert, that "three coffee shops are nearby," "three offers are available within the mall," "three fuel stations are upcoming along your route," or that "three fuel stations are available at your destination." As can be appreciated, the user 101 can receive any content related to one or more of the clustered points of interest.

While the examples and embodiments described herein illustrate providing a clustered geofence alert to a user 101, it will be appreciated that the geofence management system 120 can provide multiple clustered geofence alerts to a particular user 101. For example, the geofence management system 120, operating or otherwise executing partially or entirely on the user device 110, obtains the location of the user device 110. Based on the location of the user device 110, the geofence management system 120 may cluster two or more nearby points of interest based on their proximity to each other. The geofence management system 120 may separately, based on the same location determination of the user device 110, cluster two or more nearby points of interest based on their affiliation to a merchant chain, for example. The geofence management system 120 can then define separate geofence boundary for the clustered points of interest—one encompassing the those clustered based on proximity and another encompassing those points of interest clustered based on affiliation to the merchant chain. In certain example embodiments, the geofence management system 120 provides clustered geofence boundaries and content-based alerts, along with convention geofence alerts.

Figure 3:
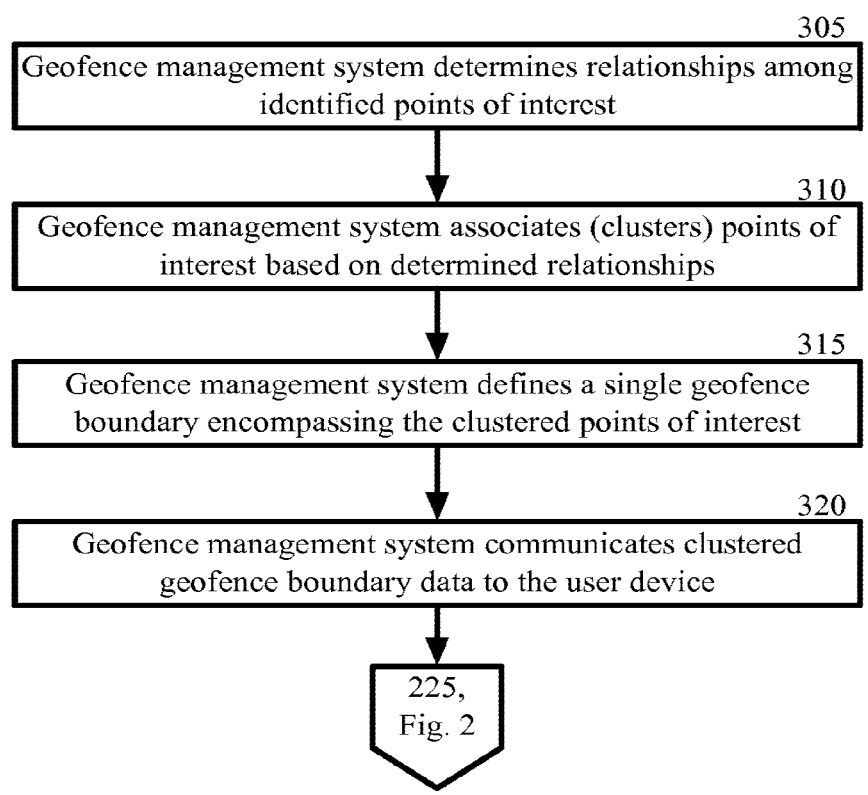
FIG. 3 is a block flow diagram depicting a method for associating (clustering) points of interest within a clustered geofence boundary, in accordance with certain example embodiments.

FIG. 3 is a block flow diagram depicting a method for establishing a user account with an geofence management system 120, in accordance with certain example embodiments.

With reference to FIGS. 1 and 2, in block 305 of method 220, the geofence management system 120 determines relationships among the identified points of interest. That is, after identifying specific points of interest as described above with reference to block 215, the geofence management system 120 uses information about the points of interest to identify relationships among the points of interest. For example, the geofence management system 120 relies on information received from the location marketing system 130 and stored on the data storage unit 124 to identify relationships among the points of interest. In certain other example embodiments, the geofence management system 120 may use a web crawler to locate information regarding identified points of interest. That is, the geofence management system 120 may use a search engine (not shown) associated with geofence management system 120 to determine that two locations share a relationship.

Numerous relationships among points of interest are possible. In certain example embodiments, points of interest relate to each other based on proximity. That is, the identified points of interest relate to each other based on their distance to each. To determine proximity among the identified points of interest, the geofence management system 120 compares the location data of the identified points. That is, the proximity of the points of interest to each other is a function of their location relative to each other and the distances between the locations. For example, the geofence management system 120 may determine that three identified merchant storefronts providing offers to a user 101 are within a kilometer of each other.

Additionally or alternatively, the points of interest may relate to each other based on an affiliation. That is, based on information obtained regarding the points of interest, such as information obtained from a location marketing system 130 or a merchant regarding the points of interest, the geofence management system 120 may determine that two or more points of interest share an affiliation with each other. For example, the geofence management system 120 may determine that multiple merchant storefronts near the user device are affiliated with the same merchant chain, such as a chain of coffee shops. The geofence management system 120 thus determines that the three coffee shops share an affiliation to the coffee shop chain.

Additionally or alternatively, the geofence management system 120 may determine that separate merchant storefronts within a central location are affiliated with the central location. That is, with or without determining whether the locations are proximate to each other, the geofence management system 120 may determine that two or more points of interest exist in the same location. For example, three merchant storefronts providing offers may each be affiliated with a shopping mall, a shopping center, or any other type of shopping complex. The geofence management system 120 thus determines a relationship of affiliation to the shopping mall or shopping center for the three merchant storefronts that are within the shopping mall or shopping center.

Additionally or alternatively, the geofence management system 120 may determine an affiliation of points of interest based on offer content associated with the points of interest. That is, of several identified points of interest near the user device 110, two may be providing discount offers. For example, of five restaurants identified as being near the user device 110, two unaffiliated restaurants may be providing discounts on food purchases. The geofence management system 120 may thus determine that two otherwise unaffiliated restaurants are affiliated based on the fact that the two restaurants are both providing offers.

Additionally or alternatively, the geofence management system 120 may determine a relationship of affiliation based on a planned route or destination of the user 101. For example, a user 101 may enter destination information into a mapping application on a user device 110 as described herein. Based on identified points of interest along the route, for example, the management system 120 may determine that two or more of the points of interest are affiliated based on the planned route. For example, of several identified points of interest along the route, the geofence management system 120 may determine that two otherwise unaffiliated fuel stations are in fact affiliated because they are located along the planned route of the user device 110 (and presumably the user 101). Similarly, with or without determining whether identified points of interest are proximate to each other, the geofence management system 120 may determine that several points of interest are at the destination of the user device 110. The geofence management system 120 thus determines that the points of interest at the destination are affiliated based on their location at the destination of the user device 110.

Additionally or alternatively, the geofence management system 120 may determine a relationship of affiliation based on locations that are typically visited together. For example, the geofence management system 120 may determine that two stores near a user device are often visited together, such as recreational vehicle dealer and a camping supply store. Similarly, with or without determining whether identified points of interest are proximate to each other, the geofence management system 120 may determine that two parks are often visited together, such as Grand Teton National Park and Yellowstone National Park. In another example, the geofence management system 120 may determine that a park and a museum are often visited together and thus should be clustered within the same geofence boundary.

In block 310, the geofence management system 120 associates (clusters) points of interest based on the determined relationships among the points of interest. That is, after determining relationships among the points of interest, the geofence management system 120 groups the identified points of interest together based on the determined relationships. For example, two or more points of interest that are proximate to each other are associated with each other based on their proximity. Likewise, two or more points of interest that are affiliated with each other are associated with each other based on the affiliation. For example, three storefronts within a mall are associated with each other based on their affiliation with the mall. Five fuel stations along an anticipated route of the user device 110, for example, are associated together based on their affiliation to the anticipated route. In certain example embodiments, geofence management system 120 stores the determined association on the data storage unit 124 of the geofence management system 120, such an on an accessible record of identified and associated points of interest.

In block 315, the geofence management system 120 defines a single geofence boundary around the clustered points of interest. That is, the geofence management system 120 determines a clustered geofence boundary, such as perimeter, that encompasses two or more of the associated points of interest. For example, the geofence management system 120 defines geofence boundary data, such as latitude and longitude coordinates, that encompass two or more of the associated points of interest. Additionally or alternatively, the geofence boundary data encompassing the two or more points of interest can be a predefined set of boundaries, such as city or county limit boundaries. Further, in certain example embodiments, the geofence management system 120 can define a single geofence boundary based on points of interest that are near (or anticipated to be near) the user device. In this case, the defined geofence boundaries are dynamic based on the location of the user device. That is, if the user device moves, the geofence management system 120 may create new or additional geofence boundaries based on the new location of the user device.

In another example embodiment, clusters of points of interest can be created in advance for all users without reference to a particular location of any user. In this case, the points of interest can be determined and clustered together based on criteria described herein and associated with a geofence boundary. Then, as a particular user approaches or enters a geofence boundary, the predetermined cluster can be identified and presented to the user as described herein.

In certain example embodiments, the clustered geofence boundary data can comprise a location point and a defined, configurable radius around the location point. For example, the location point can be a central location of all identified points of interest in the cluster, a location of one of the identified points of interest in the cluster, a relational location for all points of interest in the cluster (for example, a mall location in which the points of interest are located), or other suitable location point. As a configurable radius, the radius around the location point can be any distance that the geofence management system 120 determines. For example, the configurable radius of the clustered geofence boundary around a mall may be 200 meters, such that a user device 110 in the mall parking lot, or a user device 110 entering the mall, receives a clustered geofence alert for the mall as described herein. Alternatively, the configurable radius may be larger. For example, the geofence management system 120 may define a clustered geofence boundary radius of 5, 10, 15, 20, 25, 30, 35, 40, 50, 70, 80, 100, or more kilometers around an anticipated destination of the user device 110.

In certain example embodiments, the clustered geofence boundary data may encompass the associated points of interest by establishing a geofence that does not rely on a radius, but rather a defined region or barrier between the associated points of interest and the user device 110. That is, the geofence management system 120 establishes a pass-through geofence barrier between the associated points of interest and the user device 110. For example, the geofence management system 120 may define a region that is five kilometers long and one kilometer wide and that lies between the associated points of interest and the user device 110, thus forming a five kilometer barrier line between the associated points of interest and the user device 110. When the user device 110 passes through the geofence barrier, the geofence management system 120 provides the clustered geofence alert as described herein.

In block 320, the geofence management system 120 communicates the clustered geofence boundary data to the user device 110. That is, after the geofence management system 120 determines clustered geofence boundary data encompassing the two or more of the associated points of interest, the geofence management system 120 transmits the data to the user device 110. For example, the geofence management system 120 transmits latitude and longitude coordinates to the user device 110 for the clustered geofence boundary. The user device 110 receives the transmission, and then stores the geofence boundary data as described herein, such as in the cache of the user device 110 and/or on the data storage unit 114 of the user device 110.

It will be appreciated that the functionality of the geofence management system 120 may operate or otherwise execute partially or entirely on the user device 110. For example, the geofence management system 120 may operate with or otherwise execute within or in association with the location application 112 on the user device 110. That is, the user device 110, such as a mobile telephone, obtains and stores location data for points of interest, along with associated content for the points of interest, in the data storage unit 114 of the user device 110. An application on the user device 110, such as the location application 112, determines the location of the user device 110 in conjunction with a location-based service or via a global positioning system. The location application 112 then determines points of interest that are near the user device 110, or that are along a planned route or destination of the user device 110. The location application 112 clusters related points of interest, and then defines a clustered geofence boundary around the clustered points of interest. The location application 112 stores the clustered geofence boundary data in the data storage unit 114 of the user device 110, for example. The location application 112 then monitors the location of the user device 110 and determines when the user device 110 is at or within the clustered geofence boundary. Based on the clustered geofence entrance event, the location application 112 provides a content-based alert to the user 101 regarding one or more of the points of interest, and the user 101 receives the alert.

In an example embodiment, the user device 110, such as a mobile telephone of the user 101, determines a first location of the user device 110. The mobile telephone then communicates the first location to the geofence management system 120. That is, the mobile telephone communicates location data to geofence management system 120, and the geofence management system 120 receives the location data. Based on the first location of the mobile telephone, the geofence management system 120 identifies points of interest near the mobile telephone and then associates (clusters) points of interest based on relationships among the points of interest as described herein. The geofence management system 120 determines a single geofence boundary encompassing two or more of the associated points of interest, and then communicates the geofence boundary data for the clustered geofence boundary to the mobile telephone.

The mobile telephone receives the clustered geofence boundary data. The mobile telephone then determines a second location for the mobile telephone, and communicates the location data for the second location determination to the geofence management system 120. Based on the second location data from the mobile telephone, the geofence management system 120 determines that the mobile telephone has entered the geofence boundary. The geofence management system 120 then communicates a notification to the mobile telephone to provide a clustered, geofence-based alert on the mobile phone. That is, the geofence management system 120 instructs the mobile telephone to provide an alert regarding one or more of the associated points of interest. The mobile telephone receives the notification, and then provides the clustered geofence-based alert on the mobile telephone. The user 101 receives the clustered, geofence-based alert on the user's mobile telephone.

Figure 4:
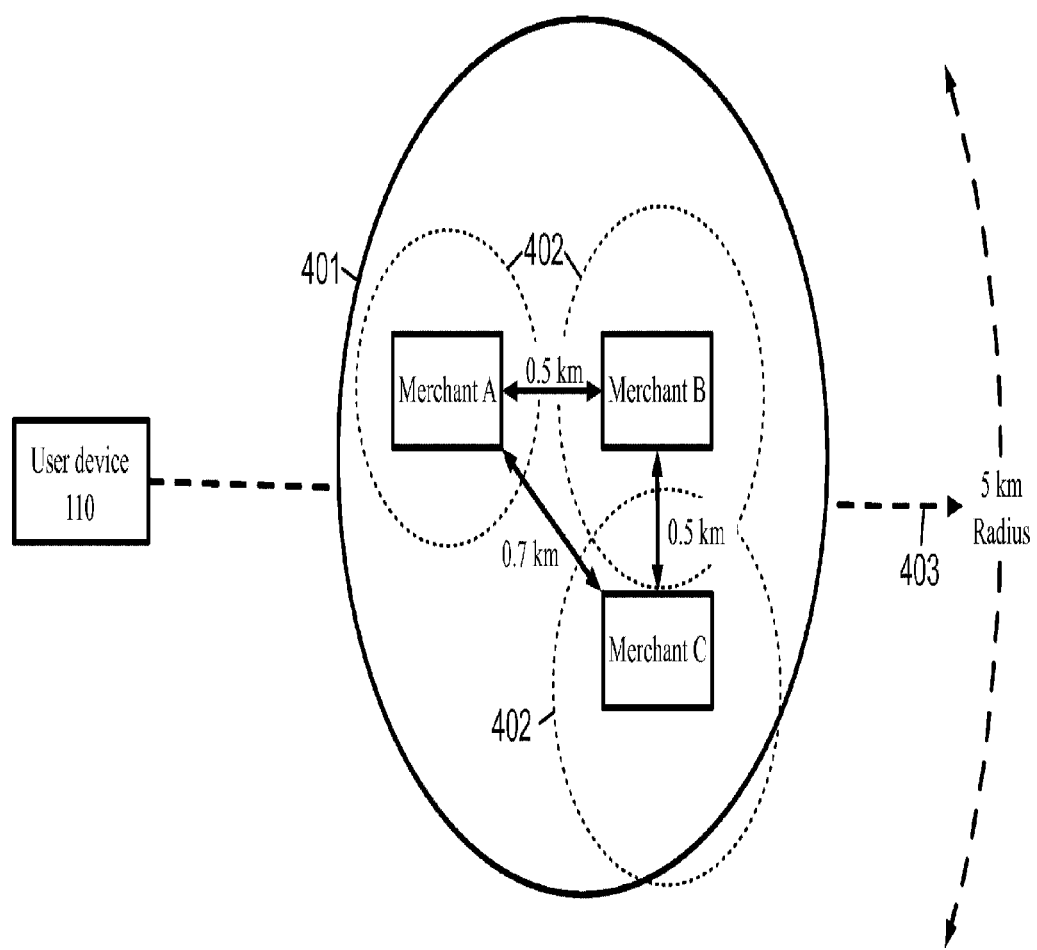
FIG. 4 is a diagram depicting points of interest associated into a single (clustered) geofence boundary based on proximity, in accordance with certain example embodiments.

FIG. 4 is a diagram depicting points of interest associated into a single (clustered) geofence boundary based on proximity in accordance with certain example embodiments. For example, the geofence management system 120 determines that three merchant storefronts (Merchant A, Merchant B, and Merchant C) are each within a five kilometer radius 403 of a user device 110. Rather than establishing a separate geofence boundary 402 around each of the three merchant storefronts, the geofence management system 120 defines a single, clustered geofence boundary 401 around the three merchant storefronts. When the user device 110 enters the clustered geofence boundary 401, the geofence management system 120 notifies the user device 110 to alert the user of the entrance event. For example, the user device 110 provides a single alert to the user that "you have three nearby offers."

In certain example embodiments, the geofence management system 120 clusters points of interest together based on relationships as described herein, but without regard to the location of a particular user device 110. That is, the geofence management system 120 does not, in certain embodiments, dynamically cluster geofences together as a particular user device 110 changes location. Rather, the geofence management system 120 obtains and stores location data for points of interest as described in block 205. After obtaining and storing location data for points of interest, the geofence management system 120 associates (clusters) points of interest within a clustered geofence boundary. That is, the geofence management system 120 determines relationships among the points of interest, such as proximity or affiliation as described herein.

The geofence management system 120 then associates (clusters) the related points of interest together based on the determined relationships. The geofence management system 120 also defines a single geofence boundary encompassing the clustered points of interest as described in blocks 310 and 315. For example, merchant storefronts that are close together or that are often visited together may be clustered into a single, clustered geofence boundary. Additionally or alternatively, the geofence management system 120 may cluster points of interest into a single geofence boundary along a route that multiple users travel, such as an interstate or major highway. The geofence management system 120 communicates the clustered geofence boundary data to one or more user devices 110 as described in block 320. When the one or more users enter the clustered geofence boundary, the geofence management system 120 identifies the entrance event (as described in block 225) and provides a clustered geofence notification on the user device 110 (as described in blocks 230 and 235).

Other Example Embodiments

Figure 5:
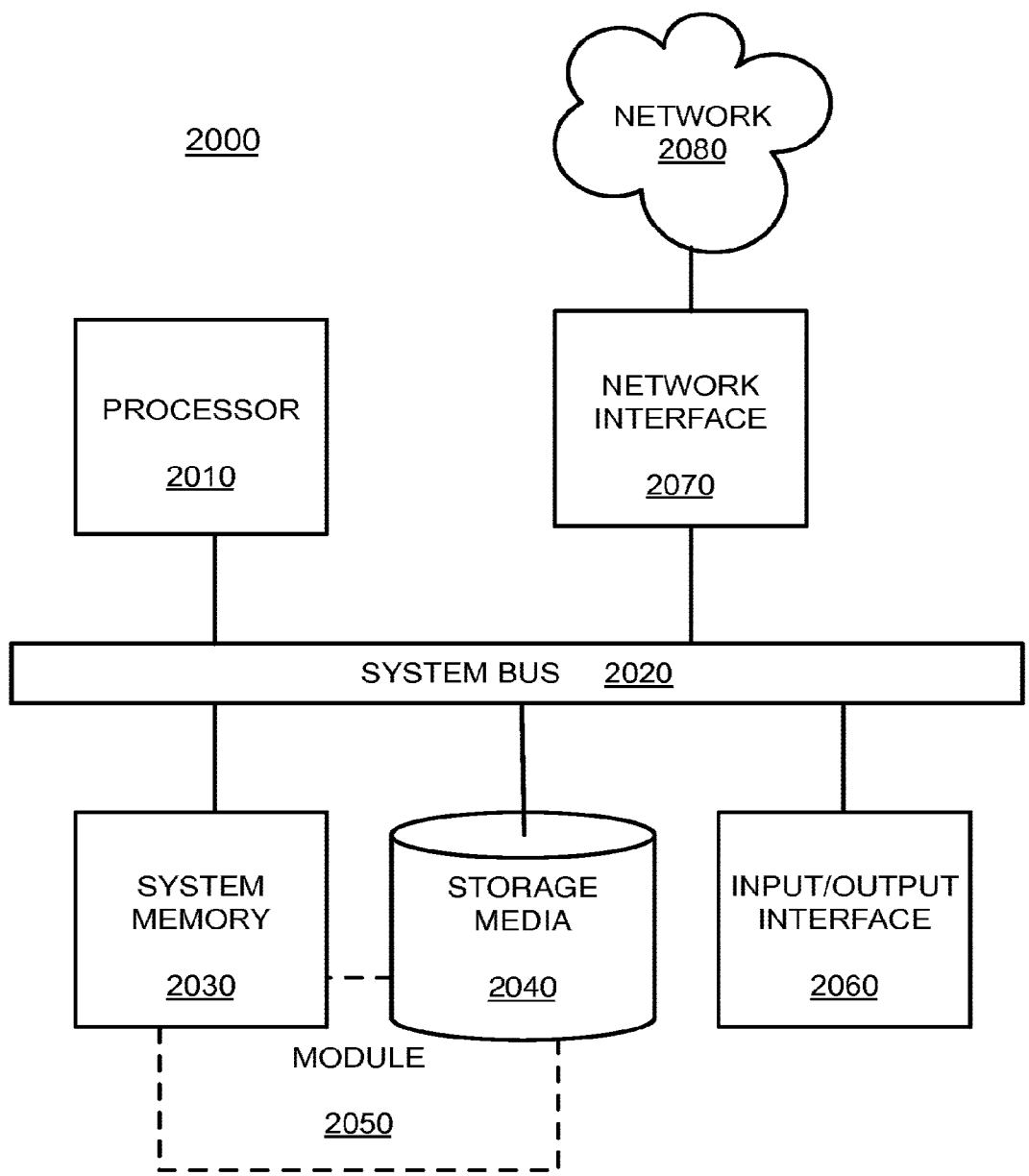
FIG. 5 is a block diagram depicting a computing machine and a module, in accordance with certain example embodiments.

FIG. 5 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to provide combined alert notifications, comprising:
    determining, by one or more computing devices, a relationship among two or more points of interest;
    associating, by the one or more computing devices, the two or more points of interest in response to determining the relationship among the two or more of the points of interest;
    determining, by the one or more computing devices, a clustered geofence boundary encompassing the associated points of interest;
    communicating, by the one or more computing devices, geofence boundary data to a user computing device for the clustered geofence boundary encompassing the associated points of interest, wherein the user computing device is separate and distinct from the one or more computing devices;
    determining, by the one or more computing devices, that the user computing device has entered the clustered geofence boundary; and
    providing, by the one or more computing devices, a combined alert on the user computing device regarding the associated points of interest when the user computing device is determined to be within the clustered geofence boundary.

2. The computer-implemented method of claim 1, wherein determining that the user computing device has entered the clustered geofence boundary comprises receiving an indication from the user device that the user computing device as entered the clustered geofence boundary.

3. The computer-implemented method of claim 1, wherein the two or more points of interest are associated based on a relationship of proximity.

4. The computer-implemented method of claim 1, wherein the two or more points of interest are associated based on a relationship of affiliation.

5. The computer-implemented method of claim 4, wherein the two or more points of interest are affiliated with a location.

6. The computer-implemented method of claim 1, further comprising receiving, by the one or more computing devices, a planned route or destination from the user computing device.

7. The computer-implemented method of claim 6, wherein the two or more points of interest are associated based on a relationship with the planned route or destination.

8. The computer-implemented method of claim 1, wherein the combined alert comprises content information for one or more of the associated points of interest.

9. A system to provide combined alert notifications, comprising:
    a storage device;
    a processor communicatively coupled to the storage device, wherein the processor executes application code instructions that are stored in the storage device to cause the system to:
        determine a relationship among two or more points of interest;
        associate two or more points of interest in response to determining the relationship among the two or more points of interest;
        determine a clustered geofence boundary encompassing the associated points of interest;

communicate geofence boundary data to a user computing device for the clustered geofence boundary encompassing the associated points of interest;
determine that the user computing device has entered the clustered geofence boundary; and,
provide a combined alert on the user computing device regarding the associated points of interest when the user computing device is determined to be within the clustered geofence boundary.

10. The system of claim 9, wherein determining that the user computing device has entered the clustered geofence boundary comprises receiving an indication from the user computing device that the user computing device has entered the clustered geofence boundary.

11. The system of claim 9, wherein the two or more points of interest are associated based on a relationship of proximity or affiliation.

12. The system of claim 10, wherein the two or more points of interest are affiliated with a central location.

13. The system of claim 9, wherein the processor is further configured to execute application code instructions that are stored in the storage device to cause the system to receive a planned route or destination from the user computing device.

14. The system of claim 13, wherein the two or more points of interest are associated based on a relationship with the planned route or destination.

15. A computer program product, comprising:
a non-transitory computer-readable storage device having computer-executable program instructions embodied thereon that when executed by a computer cause the computer to provide alert notifications, the computer-executable program instructions comprising:
computer-executable program instructions to determine a relationship among two or more points of interest;
computer-executable program instructions to associate the two or more points of interest in response to determining the relationship among the two or more of the points of interest;
computer-executable program instructions to determine a clustered geofence boundary encompassing the associated points of interest;
computer-executable program instructions to communicate geofence boundary data to the user computing device for the clustered geofence boundary encompassing the associated points of interest;
computer-executable program instructions to determine that the user computing device has entered the clustered geofence boundary; and,
computer-executable program instructions to provide a combined alert on the user computing device regarding one or more of the associated points of interest when the user computing device is determined to be within the clustered geofence boundary.

16. The computer program product of claim 15, wherein determining that the user computing device has entered the clustered geofence boundary comprises receiving an indication from the user computing device that the user computing device has entered the clustered geofence boundary.

17. The computer program product of claim 15, wherein the two or more points of interest are associated based on a relationship of proximity or affiliation.

18. The computer program product of claim 17, wherein the two or more points of interest are affiliated with a central location.

19. The computer program product of claim 15, further comprising computer-executable program instructions to receive a planned route or destination from the user computing device.

20. The computer program product of claim 19, wherein the two or more points of interest are associated based on a relationship with the planned route or destination.

* * * * *